United States Patent [19]

Alldritt et al.

[11] 4,284,351
[45] Aug. 18, 1981

[54] PROCESSING OF DIGITAL SIGNALS

[75] Inventors: Michael Alldritt, Worcester; Robin Jones, Malvern; Christopher J. Oliver, Malvern; John M. Vaughan, Malvern, all of England

[73] Assignee: National Research Development Corporation, London, England

[21] Appl. No.: 152,216

[22] Filed: May 21, 1980

Related U.S. Application Data

[63] Continuation of Ser. No. 914,812, Jun. 12, 1978, abandoned.

[51] Int. Cl.³ .................. G01P 3/36; G01R 23/16; H03K 5/00
[52] U.S. Cl. .................. 356/28.5; 324/77 B; 324/77 H; 324/77 J; 328/140
[58] Field of Search .................. 356/28.5; 343/5.8 A; 328/140; 324/186, 77 B, 77 H, 78 J

[56] References Cited

U.S. PATENT DOCUMENTS 3,939,411  2/1976  James .................. 324/77 H

FOREIGN PATENT DOCUMENTS 1364975  8/1974  United Kingdom .................. 324/77 B
1389321  4/1975  United Kingdom .................. 324/77 B

OTHER PUBLICATIONS

R. M. Huffaker et al., Proc. IEEE, vol. 58, No. 3, Mar. 1970.
C. Riva et al., Investigation of Ophthalmology, vol. 11, No. 11, Nov. 1972.
H. M. Gerard et al., IEEE Transactions on Microwave Theory and Techniques, vol. MTT 21, No. 4, Apr. 1973, p. 176.
C. C. Han, Rev. Sci. Instrum., vol. 49, No. 1, Jan. 1978.

Primary Examiner—S. C. Buczinski
Attorney, Agent, or Firm—Pollock, Vande Sande and Priddy

[57] ABSTRACT

A method of, and apparatus for, processing a digital electric signal composed of a train of discrete uniformly or non-uniformly shaped pulses to recover spectral information contained in the spacings between the pulses, in which the digital signal is applied to a SAW spectrum analyzer arranged to produce output signals the envelopes of which represent the power spectrum over a selected frequency range of constituent sample lengths of the digital signal, and the required spectral information then derived from these output signals, for example by integration thereof over a period of time.

The technique may be used in conjunction with a laser Doppler velocity measurement system in which each pulse of the digital signal represents the detection of a photon scattered from a moving object or particle in a scattering volume illuminated by laser light, the spacing between the pulses containing information regarding the velocity of movement of the object or particles under observation.

5 Claims, 1 Drawing Figure

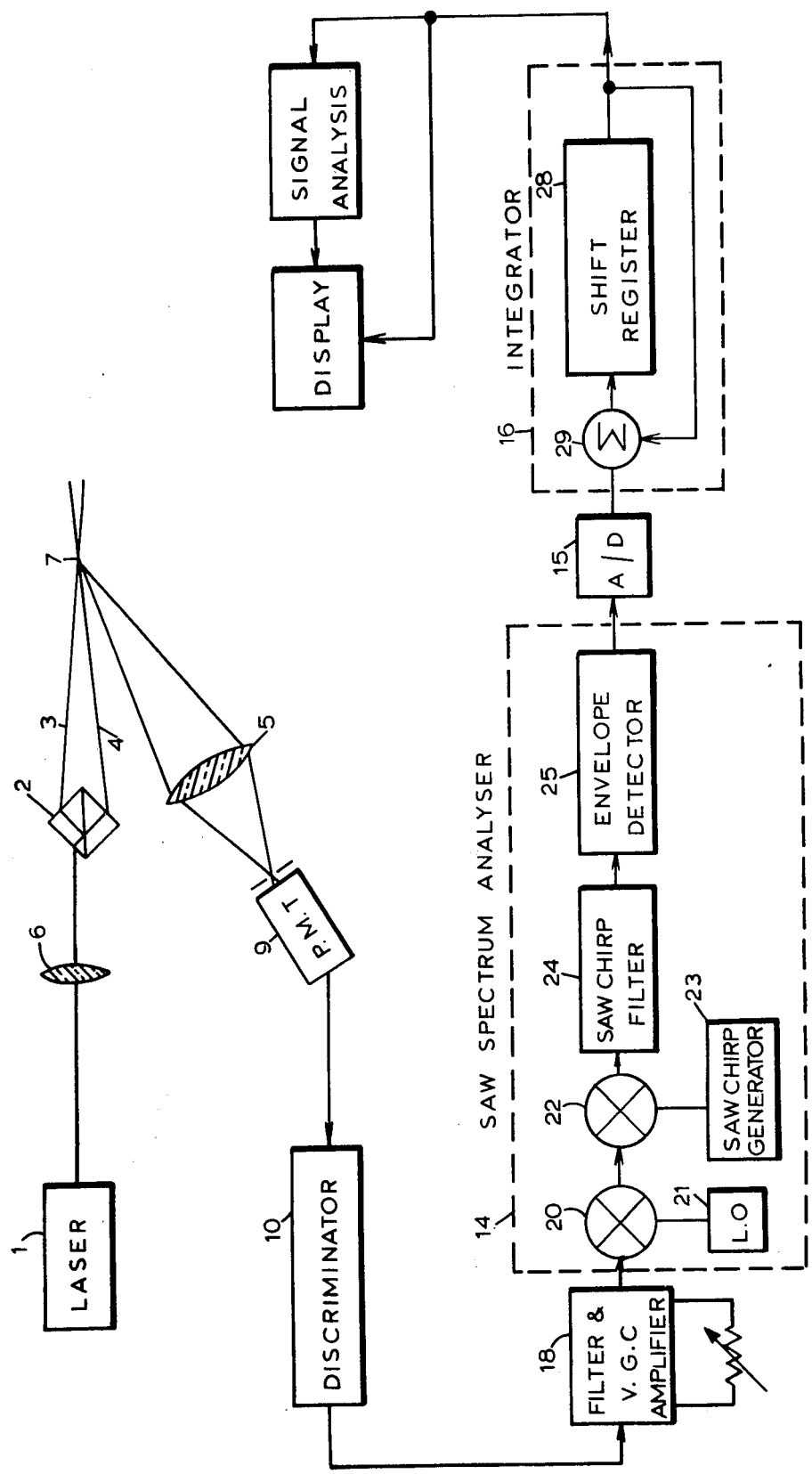

PROCESSING OF DIGITAL SIGNALS

This is a continuation of application Ser. No. 914,812, filed June 12, 1978, now abandoned.

This invention relates to a method of and apparatus for processing a digital signal composed of a train of discrete pulses to recover spectral information contained in the signal.

The technique of laser Doppler anemometry or velocimetry is now well established (Optics and Laser Technology 1974, Vol. 6, No. 6, 249–261). As described in the above article a common form of laser Doppler anemometer is the Doppler-difference system in which two laser beams from the same source are made to intersect to produce a set of interference fringes in their crossover region, and signals scattered from particles traversing the crossover region are collected and analyzed. These signals will be modulated at a frequency dependent upon the spacing of the fringes and on the velocity of the particles, but independent of the scattering direction.

The scattered optical signal from each particle traversing the crossover region will be composed of a stream of photons each of which can be individually processed by a photon counting detector to give a recognizable output from each one. The stream of photons can thus be converted into a train of electrical pulses each of which represents the instant at which a photodetection took place.

In order to obtain information regarding the velocity of the particles from which the detected photons are scattered, it is necessary to extract information contained in the spacings between the pulses of the train, ie in the timing of the pulses. For a steady, unmodulated stream of photons, the pulse train will be a random process, Poisson distributed in time; ie there are no correlations between the photon arrival time. However, where the stream of photons is fluctuating or modulated by passage of the particles across the fringes, there will be correlations between the pulses of the train. These correlations can be extracted either by direct autocorrelation of the digital train with itself (photon correlation) or by spectral analysis of the signal. It is with the latter technique that the present invention is concerned.

Two forms of signal processing apparatus are commonly used for determining the power spectrum of a digital signal composed of a train of discrete pulses. The first of these is the swept-filter spectrum analyzer in which a narrow bandwidth filter is swept across a range of frequencies and the output squared and recorded. This procedure yields the power spectrum of the input signal to the filter, provided that the inverse bandwidth and experimental time are both large in comparison to the mean time between particle transits, but it is inefficient because the instrument is tuned to only one frequency at a time as it scans through the required frequency range.

This problem is avoided by the second form of signal processor comprising a parallel bank of filters at adjacent frequencies covering the desired frequency range. In this type of spectrum analyzer all frequencies are processed simultaneously and so no signal information is lost and experimental times are reduced. However a very large number of filters is required for accurate results and the procedure is cumbersome.

According to the present invention, a method of processing a digital electrical signal composed of a train of discrete pulses, to recover spectral information contained in the spacings between the pulses, comprises the steps of applying the digital signal to a surface acoustic wave (SAW) spectrum analyzer arranged to produce output signals the envelopes of which represent the power spectrum, over a selected frequency range, of constituent sample lengths of the digital signal, and deriving from these output signals spectral information contained in the spacings between the pulses.

For the purposes of this specification, the term digital electrical signal applies not only to signals composed of a train of discrete pulses of uniform shape, but also to such signals in which the pulses are of non-uniform shape, eg having varying pulse heights, and in which spectral information of interest is contained in the spacings between the pulses.

Where the digital signal is composed of a train of discrete uniformly shaped pulses, each of the output signals from the SAW spectrum analyzer will contain two types of spectral information. Firstly it will contain information regarding the power spectrum of the individual pulse shapes, which in the case of short duration pulses, will be a relatively broad band spectrum. Secondly, it will contain spectral information relating to the spacings between the pulses, and in particular to the correlations between the pulse spacings. It is the realization by the inventors, that this second type of spectral information can be recovered from digital signals using a SAW spectrum analyzer, on which the invention is based.

There is a third type of spectral information which will be contained in the output signals of the SAW spectrum analyzer where the pulses of the digital signal are of varying heights, and that is the spectral information contained in the pulse height variation in time. This type of information may readily be eliminated from such a digital signal before application to the SAW spectrum analyzer by passing it through a discriminator or like pulse-shaping circuit to convert it to a train of uniformly-shaped pulses, preferably of short-duration. This pulse-shaping process will also predetermine the spectrum of the individual pulse shapes, facilitating recovery of the desired pulse timing information. In some applications however, the use of pulse shaping circuits for this purpose may be undesirable, as it places an upper limit on the pulse repetition rate that can be processed without loss of signal information due to the speed limitations of such circuits.

Preferably, spectral information contained in the pulse spacings is derived from a plurality of output signals from the SAW spectrum analyzer, integrated together to provide an integrated output signal representing the overall power spectrum, over a selected frequency range, of constituent sample lengths of the digital signal. This integration procedure is usually required to recover the desired information because the length of each sample of the digital signal from which the SAW spectrum analyzer produces an output signal is very short (typically in the range 10 to 50 microseconds). Thus, unless the number of pulses contained in any sample from which an output signal from the SAW spectrum analyzer is produced is relatively high, very little spectral information regarding the pulse spacings can be recovered from a single output signal. Generally, meaningful information from a single output signal can only be recovered if the sample length of the digital signal from which it is derived contains more than 5 pulses. However, by integrating a plurality of output signals from the SAW spectrum analyzer, an integrated spectrum of the digital signal can be built up over an extended integration period, enabling the desired spectral information to be recovered, even from output signals from which the information could not be recovered individually.

The invention enables the analysis to be carried out in real time, and the final integrated spectrum can either be displayed, or recorded.

The desired spectral information regarding the pulse spacings of the digital signal will appear in the power spectrum of the signal as one or more well-defined peaks, each representing the frequency at which a correlation between the pulse spacings occurs. Depending on the nature of the digital signal, the positions of these peaks may either remain stationary or vary with time.

To enable the time variation in the positions of such a peak in the power spectrum to be monitored (frequency-tracking), repeated integrations of successive groups of output signals from the SAW spectrum analyzer may be performed to produce a succession of integrated output signals representing the power spectrum, in a selected frequency range containing the peaks, of the digital signal at successive intervals of time. The frequency represented by the peak amplitude component each of the succession of integrated output signals may then be determined to provide an indication of the variation of this frequency with time. The integration period for each integrated output signal should be short in relation to the time variation of the peak frequency component.

Alternatively a similar process may be carried out on individual output signals from the SAW spectrum analyzer, instead of on integrated groups of output signals, where sufficient information is contained in the individual output signals to enable the position of the peak to be determined with reasonable accuracy.

The invention also extends to a method of velocity measurement, eg by laser Doppler velocimetry, comprising the illumination with laser light of a region in space in which the movement to be measured takes place, detecting individual photons scattered from the illuminated region to produce a digital electrical signal composed of a train of discrete pulses each representing the detection of an individual photon, and processing the digital signal by a method as aforesaid to derive information regarding the velocity of the measured increment.

According to another aspect of the present invention, apparatus for processing a digital electrical signal composed of a train of discrete pulses to recover spectral information contained in the spacings between the pulses, comprises a surface acoustic wave (SAW) spectrum analyzer adapted to receive the digital signal and to produce output signals the envelopes of which represent the power spectrum, in a selected frequency range, of constituent sample lengths of the digital signal, and integration means for integrating a plurality of output signals from the SAW spectrum analyzer to produce an integrated output signal representing the power spectrum of a plurality of constituent sample lengths of the digital signal.

The apparatus enables real time analysis of the digital signal in which short sample lengths of the signal are sampled by the SAW spectrum analyzer at regular intervals so that its output comprises a series of individual output signals the envelopes of which represent the power spectrum of successive sample lengths of the digital signal. The integrator effectively additively superimposes these output signals in real time to produce an integrated spectrum.

The integrator may comprise a shift register arranged to operate in synchronism with the SAW spectrum analyzer, and summation means arranged to add amplitude samples of corresponding frequency components of successive output signals from the SAW spectrum analyzer and to feed them successively into separate storage locations of the shift register.

The apparatus may include means for periodically determining the frequency representing the peak amplitude component of the integrated output signal derived by the integration means during successive integration periods to provide an indication of the variation of this frequency with time (frequency-tracking).

For frequency-tracking purposes, the integration means may not be required where sufficient information is contained in the output signals from the SAW spectrum analyzes to enable the position of the peak amplitude component to be determined with reasonable accuracy. Apparatus in accordance with the invention for such applications may comprise a SAW spectrum analyzer, and means for periodically determining the frequency represented by the peak amplitude component of respective ones of the output signals from the SAW spectrum analyzer to provide an indication of the variation of this frequency with time.

The invention also extends to velocity measurement apparatus comprising a laser for illuminating a region in space in which the movement to be measured takes place, a photon detector for detecting individual photons scattered from the illuminated region to produce a digital electrical signal composed of a train of discrete pulses each representing the detection of an individual photon, and apparatus as aforesaid for processing the digital electrical signal produced by the photon detector, to recover spectral information contained in the pulse spacings.

Where the pulses of the digital output signal from the photon-detector are of non-uniform shape, the apparatus may further include pulse-shaping means for converting the variable-shaped pulses into short-duration pulses of uniform shape. As discussed above, this pulse shaping is not essential, and may be undesirable, for example, where the pulse repetition rate of the photon detector output signal is very high.

The invention will now be further described, by way of example only, with reference to the accompanying drawing which shows a laser Doppler anemometer incorporating signal processing apparatus in accordance with the invention.

Referring to the drawing, the optical arrangement of the laser Doppler anemometer or velocimeter is of the standard Doppler difference type in which light from a laser source 1 in this case a 10 mW Helium-Neon laser, is split equally into two separate converging beams 3,4 by a prismatic beam splitter 2, and the light scattered by particles carried by a fluid moving across the crossover region 7 of the two beams is collected by a wide-aperture lens 5 and received by a detector 9 in the form of a photon-counting photomultiplier tube. A simple lens 6 is inserted paraxially between the laser source 1 and the beam splitter 2 to focus the two beams at their point of intersection or crossover region 7. This crossover region and the aperture or field stop on the face of the detector together define the region in space, or scattering volume, from which information regarding the velocity of fluid traversing the region is obtained.

According to the so-called 'fringe' model of the Doppler difference technique a pattern of interference fringes lying parallel to the axis of symmetry of the two beams is formed in the crossover region 7, the fringe spacing being $S = \lambda/2 \sin(\theta/2)$, where $\lambda$ is the wavelength of the incident radiation and $\theta$ is the angle of intersection of the two beams. Thus the light signals received at the detector 9 from a particle traversing the crossover region 7 will be modulated at a frequency $f = (2\mu \sin(\theta/2))/\lambda$, where $\mu$ is the component of velocity of the scattering particle in the direction perpendicular to the fringes.

The output of the detector 9 is composed of a train of electrical pulses each of which represents the detection of a photon. The shape of these pulses is standardized in a discriminator 10 to produce uniformly shaped pulses of very short duration, typically 20 nanoseconds.

The power spectrum of this train of digital pulses will contain two types of frequency information. Firstly it will contain information regarding the spectrum of the individual pulse shapes, which, because of the very short pulse duration, will be a relatively broad background spectrum. Secondly, it will contain information regarding periodic variations in the pulse spacings corresponding to modulation in the intensity of the optical signal received by the detector 9. From this, information can be derived about the velocity of the scattering particles in the scattering volume.

In order to extract this spectral information the pulse train is, in accordance with the invention, applied to signal processing apparatus including a surface acoustic wave (SAW) spectrum analyzer 14. In addition, the signal processing apparatus includes an analogue-to-digital (A/D) converter 15 and a digital integrator 16 which integrates the real-time output of the spectrum analyzer 14 to build up over a period of time a comparatively noise-free estimate of the power spectrum of the input signal.

The signal processing system and its method of operation will now be described in greater detail. The train of uniformly shaped pulses emerging from the discriminator 10 is applied to a filter and variable gain control amplifier circuit 18, the gain of which can be adjusted for calibration purposes, before entering the SAW spectrum analyzer 14. The spectrum analyzer may be of any standard commercially available type suitable for spectrally analyzing analogue signals in the same frequency band, for example Model No 1740 manufactured by Microwave and Electronics Systems Ltd (MESL). (The use of the SAW spectrum analyzer on digital signals to extract information contained in the pulse spacings has not hitherto been contemplated).

It essentially comprises a first mixer 20 for multiplying the input signal with the output of a local oscillator 21, the frequency of which can be adjusted to vary the frequency range of the analyzer, a second mixer 22 for multiplying the output of the first mixer 20 with the output of a SAW chirp signal generator 23, a SAW chirp filter 24 and an envelope detector 25. The first mixer 20 serves to translate the input signal to a suitable intermediate frequency on which the chirp generator 23 and chirp filter 24 can operate.

The chirp generator 23 comprises a SAW chirp filter or dispersive delay line of 25 microseconds duration which is impulsed at regular intervals, in the present example every 51 microseconds. The output is thus a train of chirp signals (signals of which the frequency varies with time) each of 25 microseconds duration and repeated every 51 microseconds. These chirp signals are mixed with the output from the first mixer 20 in the second mixer 22, which thus effectively takes 25 microsecond samples of the input signal at intervals of 51 microseconds (the output of the mixer 22 only being non-zero upon coincidence of its two input signals) and applies them the SAW filter 24.

The SAW filter 24 is again a chirp filter or dispersive delay line similar to that of the chirp generator 23, but having a frequency/time characteristic of opposite slope. Thus while the filter of the chirp generator 21 acts as an expander, the SAW filter 24 acts as a compressor. The output of the filter 24 for each 25 microsecond 'sample' is the real time Fourier transform of the input signal over the 25 microsecond period. The envelope detector 25 processes, eg squares, the modulus of the output of the filter 24 to produce a separate output signal for each of the 25 microsecond samples of the original input signal the envelope of which output signal represents the power spectrum of that sample over a selected frequency range determined by the frequency of the local oscillator 21.

Because the sampling period of the spectrum analyzer is relatively short, the usefulness of the individual 'sample spectra' will depend on the mean pulse repetition rate of the input pulses, and on the period of any modulation in this rate which contain the wanted velocity information. For very low scattering intensities, giving rise to only 2 or 3 pulses per 25 microsecond sample on average, the amount of information contained in the spectrum of an individual sample regarding periodic modulations in the separations of the pulses will be very small.

However, the inventors have discovered that sufficient of this information is retained, and that, by integrating a number of these individual sample spectra together over a period of time, a comparatively noise-free estimate at the input signal spectrum, showing the frequencies of periodic variations in the spacing of the pulses, can be achieved.

In the present embodiment, this integration is carried out digitally and so the output from the SAW spectrum analyzer is applied to an A/D converter 15, optionally via a logarithmic amplifier not shown. The A/D converter converts the individual sample spectra into digital form with a 4-bit binary (16 level) accuracy at a 10 MHz digitizing rate. This digitizing rate is consistent with the resolution of the spectrum analyzer 14. The output of the A/D converter 15 comprises a stream of 4-bit words the value of each of which represents the amplitude of a particular frequency component of the current sample spectrum.

The digitized sample spectra are then applied to the integrator 16 which comprises a 516 stage 16-bit wide 10 MHz shift register 28 and a summation circuit 29. The shift register 28 is cycled in synchronism with the A/D converter 15 so that for successive sample spectra, the 4-bit digital amplitude samples corresponding to the same frequencies are added into the same 16 bit shift register word by the summation circuit 29 so that after a number of cycles an integrated spectrum will be built up from spectral information collected over a period of time. Correlations between the spacings of the pulses will appear as well-defined peaks at positions corresponding to the frequency or frequencies at which the correlations occur, above a background of noise representing the spectrum of the individual pulse shapes; the shorter the pulse durations, the flatter this background spectrum will be. The number of cycles over which the integration is carried out may be preset, or the cycle may be repeated until a preset trip level has been reached by the largest amplitude component of the spectrum. The integrated output signal is then further analyzed to obtain information regarding the velocity of the particles.

The number of cycles required to build up a comparatively noise-free estimate of the input signal spectrum will depend on the length of the samples taken by the spectrum analyzer (the longer these are the better the resolution) and on the mean rate of photon detections. Where the velocity of the fluid carrying the scattering particles across the scattering volume is steady, the positions at which the corresponding peak appears in the power spectrum of the input signal will remain substantially fixed, indicating a steady flow. However, where the measured fluid flow is unsteady or turbulent, the flow velocity will vary with time, and so the corresponding peak frequency of the spectrum will vary in position accordingly.

In order to track these variations in the frequency of the largest amplitude component, the integrator 16 may be arranged to perform repeated integrations of successive groups of output signals from the SAW spectrum analyzer 14, the number of output signals in each group being either preset or determined by appropriate setting of the aforementioned trip level. At the end of each integration period, the frequency represented by the shift register word having the largest value is determined, using any suitable known technique, and the variation of this peak frequency derived from successive integration periods either displayed or recorded to provide a substantially continuous indication of the time variation of the measured parameter, in this case velocity.

The peak frequency may be determined by serially reading the words of the shift register into a comparator circuit which initially stores the value and position of the first word, and then scans through the remaining words, comparing its stored word value with that of successive words and changing its stored word value and word position to that of a subsequent word only when the value of the subsequent word exceeds that of the stored word value. The stored word position at the end of the scan thus provides an indication of the frequency of the largest amplitude component of the integrated spectrum represented by the content of the shift register at the end of each integration period.

Sufficient spectral information for such frequency scanning can generally be derived from integration over relatively short integration periods, and in some cases, where the pulse repetition rate of the input signal is relatively high, sufficient information may be obtained from individual sample lengths of the digital input signal. In this latter case, no integration is performed; each successive output signal from the SAW spectrum analyzer is digitized, read into the shift register 28 and its peak frequency determined as described above. The shift register is thus cleared before the next successive output signal from the SAW spectrum analyzer is read in.

However, where the mean pulse repetition rate of the digital signal is low, for example only 2 or 3 pulses per 25 microsecond sample length, and a comparatively noise-free estimate of the power spectrum is required, relatively long integration times, eg 5 seconds, will be required. The resolution of the analyzer is improved by increasing the sample length. In this connection, it should be noted that the minimum number of pulses that must be contained within any sample length from which useful information can be recovered is two. However, the average number of pulses may be considerably less than this, and tending even towards zero. In this case, useful information will be obtained from the occasional samples containing two or more pulses. This situation may arise particularly where the incidence of scattering particles in the scattering volume is very low so that photo detection events occur at intervals greater then the cycle time of the SAW spectrum analyzer.

The invention provides fast and efficient real-time spectral analysis of digital signals. A wide range of frequencies can be covered by varying the intermediate frequency of the SAW spectrum analyzer which is particularly useful for anemometry of high speed flow. The spectral form of the output facilitates the high-speed extraction of the required data according to conventional techniques, eg spectral width at selected fractions of the peak height, and mean position at selected fractions of the peak height may be determined in real time.

To improve the efficiency of the signal processing apparatus, two identical SAW spectrum analyzers may be used in parallel, but with 180° phase shift between their operating cycles so that one samples latches of the input signal not sampled by the other. The outputs of both may then be applied to a common integrator to produce an integrated spectrum derived from substantially the whole of the digital input signal.

It is not essential that the pulse of the digital input signal applied to the SAW spectrum analyzer are uniformly shaped. For example the digital output signal from the photon detector 9, usually comprising a train of pulses of variable height, some of which may be overlapping to in effect also produce pulses of different widths, may be applied directly to the SAW spectrum analyzer. This may result in an increased level of noise in the output signals of the analyzer, but enables digital signals having a higher pulse repetition rates to be analyzed without loss of signal information.

The lowest frequency that the SAW spectrum analyzer is capable of resolving is determined by the sample length (25 μs in this case). In general any frequency whose half-period $T/2$ ($T=1/f$) exceeds that of the sample length will lie outside the bandwidth of the SAW spectrum analyzer, although in practice the sample may need to contain nearer a full cycle of the lowest frequency.

In order to recover information lying outside the frequency range of the SAW spectrum analyzer using apparatus in accordance with the invention, the digital signal may first be time compressed or time expanded depending on whether the required spectral information lies above or below the frequency range of the analyzer. This time compression or expansion may be achieved by tape recording the digital signal at one speed, replaying it into the SAW spectrum analyzer at a faster speed (time compression) or a lower speed (time expansion), and then applying an appropriate correction to the data derived from the SAW spectrum analyzer output signals.

Although described in its application to laser doppler velocimetry, it will be appreciated that the signal processing method and apparatus in accordance with the invention may be equally applied to the processing of any digital signal composed of a train of discrete variably or uniformly shaped pulses to recover information contained in the spacings between the pulses.

We claim:

1. A method of processing a digital electrical signal from a photon-counting detector composed of a train of discrete pulses each representing the detection of an individual photon, to recover spectral information contained in the spacings between the pulses, the method comprising the steps of applying the said digital signal to a surface acoustic wave (SAW) spectrum analyzer arranged to produce output signals which represent the power spectrum of constituent sample lengths of the digital signal over a selected frequency range, and integrating a plurality of said output signals to produce an integrated output signal representing the overall power spectrum, over at least a part of said selected frequency range, of a plurality of constituent sample lengths of the digital signal.

2. A method as claimed in claim 1 including the further steps of performing repeated integrations of successive groups of said output signals from the SAW spectrum analyzer, to produce for each group an integrated output signal representing the overall power spectrum over a selected frequency range, of the constituent sample lengths of the digital signal from which each group is derived, and determining the frequency represented by the peak amplitude component of each of said integrated output signals to provide an indication of the variation of this frequency with time.

3. A method as claimed in claim 1 wherein the individual photons are detected by a photo-multiplier tube and the output of the photo-multiplier tube is applied to a pulse-shaping circuit for converting the output pulses therefrom into short-duration pulses of uniform shape prior to their application to the SAW spectrum analyzer.

4. A method as claimed in claim 2 wherein said determination of the frequency represented by the peak amplitude component of each of said integrated output signals, comprises storing the amplitude of, and storing an indication of the frequency associated with, an initial sample of each output signal from the integrator, and scanning through successive samples of the output signal from the integrator to compare the stored amplitude value with the amplitude of successive samples and to replace the stored amplitude value and said indication of its associated frequency with those of any sample whose amplitude exceeds the stored amplitude value whereby, on completion of each scanning cycle, the stored amplitude value and its associated frequency indication represent the amplitude and frequency of the maximum amplitude component of the scanned integrator output signal.

5. A method of velocity measurement comprising the steps of illuminating with laser light a region in space in which a movement to be measured is taking place, detecting individual photons scattered from the illuminated region using a photoncounting detector to produce a digital electrical signal composed of a train of discrete pulses each representing the detection of an individual photon, and processing the digital electrical signal by a method as claimed in claim 1, claim 2, claim 3 or claim 4 to recover spectral information regarding the velocity of the movement.

* * * * *